United States Patent
Sepe, Jr. et al.

(10) Patent No.: US 6,711,556 B1
(45) Date of Patent: Mar. 23, 2004

(54) FUZZY LOGIC CONTROLLER OPTIMIZATION

(75) Inventors: Raymond B Sepe, Jr., Mefield, MA (US); John Michael Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 09/669,211

(22) Filed: Sep. 25, 2000

Related U.S. Application Data
(60) Provisional application No. 60/156,884, filed on Sep. 30, 1999.

(51) Int. Cl.$^7$ .............................................. G06F 15/18

(52) U.S. Cl. .................................. 706/6; 706/2; 706/1

(58) Field of Search ......................... 706/1–11; 318/803

(56) References Cited

U.S. PATENT DOCUMENTS

| | | | |
|---|---|---|---|
| 4,967,129 A | 10/1990 | Tanaka | |
| 5,272,428 A | * 12/1993 | Spiegel et al. | ............... 318/803 |
| 5,652,485 A | 7/1997 | Spiegel et al. | |
| 5,663,626 A | 9/1997 | D'Angelo et al. | |
| 5,880,415 A | 3/1999 | Colby et al. | |
| 6,208,981 B1 | * 3/2001 | Graf et al. | ...................... 706/2 |

OTHER PUBLICATIONS

Appearance–based visual learning in a neuro–fuzzy model for fine–positioning of manipulators Zhang, J.; Schmidt, R.; Knoll, A.; Robotics and Automation, 1999. Proceedings. 1999 IEEE International Conf., vol. 2 , (May 1999), Page(s) 1164–116.*

Review of current regulation techniques for three–phase PWM inverters Kazmierkowski, M.P.; Dzieniakowski, M.A.; Industiral Electronics, Control and Instrumentation, 1994. IECON '94., 20th Intern. Conf. vol.: 1 , Sep. 5–9, 1994 Pages 567–575.*

A sensorless position control system by salient–pole brushless DC motor Kasa, N.; Watanabe, H.; Industrial Electronics, Control and Instrumentation, 1997. IECON 97. 23rd Intern., Conf. vol.: 2 , Nov. 9–14, 1997 Page(s) 931–936 vol. 2.*

Evolutionary fuzzy neural networks automatic design of rule based controllers of nonlinear delayed systems Silva, N.; Macedo, H.; Rosa, A.; Fuzzy Systems Proceedings, 1998. The 1998 IEEE Intern Conf. vol. 2 , May 1998 Page(s) 1271–1276 vol.:*

"Fuzzy Logic Toolbox For Use With Matlab", User's Guide, Version 2, The Math Works Inc., pp. 2–76–2–81.

(List continued on next page.)

*Primary Examiner*—Ramesh Patel
*Assistant Examiner*—Michael B. Holmes

(57) ABSTRACT

A method is provided for optimizing a rotating induction machine system fuzzy logic controller. The fuzzy logic controller has at least one input and at least one output. Each input accepts a machine system operating parameter. Each output produces at least one machine system control parameter. The fuzzy logic controller generates each output based on at least one input and on fuzzy logic decision parameters. Optimization begins by obtaining a set of data relating each control parameter to at least one operating parameter for each machine operating region. A model is constructed for each machine operating region based on the machine operating region data obtained. The fuzzy logic controller is simulated with at least one created model in a feedback loop from a fuzzy logic output to a fuzzy logic input. Fuzzy logic decision parameters are optimized based on the simulation.

16 Claims, 5 Drawing Sheets

OTHER PUBLICATIONS

Parviz Famouri et al, "Loss Minimization Control of an Induction Motor Drive", IEEE Transactions on Industry Applications, vol. 27, No. 1, Jan./Feb. 1991, pp. 32–37.

Gilberto C.D. Sousa et al, "Fuzzy Logic Based On–Line Efficiency Optimization Control of an Indirect Vector Controlled Induction Motor Drive", IEEE Press, 1993, pp. 1168–1174.

Jean M. Dongmo et al, "Adaptive Fuzzy Control of AC Motors for Electric Vehicles and Manufacturing Systems", IEEE Press 1996, pp. 408–413.

B.K. Bose, "Power Electronics And Variable Frequency Drives", IEEE Press, 1997, pp. 593–597.

* cited by examiner

FUZZY LOGIC CONTROLLER OPTIMIZATION

CROSS-REFERENCE TO RELATED APPLICATION

This application claims the benefit of U.S. provisional application Ser. No. 60/156,884, filed Sep. 30, 1999, entitled "Fuzzy Logic Controller Optimization", the specification of which is expressly incorporated herein by reference in its entirety.

This invention was made with Government support under NREL Subcontract No. ZCB-4-13032-02, Prime Contract No. DE-AC36-83CH10093 awarded by the Department of Energy. The Government has certain rights in the invention.

TECHNICAL FIELD

The present invention relates to optimizing fuzzy logic controllers used in rotating induction machine systems.

BACKGROUND ART

A rotating induction machine system transfers power between a stationary member, the stator, and a rotating member, the rotor, by electromagnetic induction. The stator contains one or more sequences of coils placed in parallel slots along the stator length. The rotor is designed to revolve within the stator, typically carrying electromagnets driven by an excitation or flux control current. An induction machine may be operated as a motor by supplying alternating current electrical power to the stator. The stator current produces rotating magnetic fields within the stator, causing the rotor to revolve, and producing output power as torque at some rotational velocity. An induction machine may also be operated as a generator by suppling rotational power to the rotor, thereby inducing alternating electrical power in the stator windings.

In addition to the machine itself, additional components are typically required to drive and control the induction machine. An inverter or rectifier-inverter combination is used to provide cyclic current for motor speed control. A velocity controller compensates for slip between the rotating magnetic field and the rotor. A vector current controller determines the magnitude and timing of current control pulses.

Fuzzy logic control has been introduced into induction machine systems for estimating control parameters and for generating control signals. A fuzzy logic controller assigns each input sample to one or more sets of a membership function. Inference rules are then used to generate output values based on the membership sets of the input variables. The outputs are then "defuzzified" to generate control output signals. Fuzzy decision parameters, such as membership functions, must be optimized or tuned to achieve desired control characteristics.

An example application of a fuzzy logic controller is in controlling an induction starter/alternator for a hybrid electric vehicle. One such controlled device is the starter/alternator described in a paper by J. M. Miller et al. titled "Starter-Alternator for Hybrid Electric Vehicle: Comparison of Induction and Variable Reluctance Machines and Drives," appearing in IEEE IAS Conference Proceedings, pp. 513–523, 1998, which is incorporated by reference herein.

The induction starter/alternator may be controlled by both a velocity controller for maintaining constant rotational velocity and by a fuzzy logic controller for optimizing power efficiency. Such control systems are described in a paper by G.C.D. Sousa et al. titled "Fuzzy Logic Based On-Line Efficiency Optimization Control of an Indirect Vector Controlled Induction Motor Drive," appearing in IEEE-IECON Conference Record, pp. 1168–1174, 1993, and in U.S. Pat. No. 5,652,485 titled "Fuzzy Logic Integrated Electrical Control To Improve Variable Speed Wind Turbine Efficiency And Performance," issued Jul. 29, 1997, to Spiegel et al., each of which is incorporated by reference herein.

What is needed is improved optimization of fuzzy logic motor controller operating parameters. The optimization method should easily adapt to any changes made to the controlled system. Further, the optimization method should permit automatic tuning of fuzzy logic control parameters.

DISCLOSURE OF INVENTION

The present invention optimizes parameters of a fuzzy logic controller through simulation without having to develop complex and potentially inaccurate models of the controlled rotating induction machine system.

In general, the fuzzy logic controller has at least one input and at least one output, each input accepting a machine system operating parameter and each output producing at least one machine system control parameter. The fuzzy logic controller generates each output based on at least one input and on fuzzy logic decision parameters. The goal is to optimize the fuzzy logic decision parameters. To begin optimization, a set of data relating control parameters to operating parameters are obtained for each of one or more machine operating regions. A measurement-based model is constructed for each machine operating region based on the obtained data. The fuzzy logic controller is simulated with at least one created model in a feedback loop from at least one fuzzy logic output to at least one fuzzy logic input. Fuzzy logic decision parameters are optimized based on the simulation results. Simulating with a measurement-based model of the machine system is known as hardware-data-in-the-simulation-loop (HDSL). The use of HDSL eliminates the need to develop mathematical models representing the machine system. Such mathematical models are often imprecise approximations of the actual system. Also, any changes in the machine system requires reformulating the model.

Typically, fuzzy logic decision parameters include fuzzy membership function ranges. These values are adjusted to obtain a desired dynamic response for the machine system to a disturbance input or to a change in desired operating region. Simulating a change in desired operating region may be accomplished by switching between models based on different machine operating regions during the simulation. The fuzzy logic controller input is then monitored to determine if the response has the desired dynamic characteristics, such as settling time, overshoot, and the like. If the response does not meet dynamic requirements, membership ranges may be varied.

Decision parameters may be changed manually. As an alternative to manually changing fuzzy logic decision parameters and running the simulation again, decision parameters can be automatically tuned using adaptive neuro-fuzzy inference provided by an adaptive neuro-fuzzy inference system (ANFIS).

A method is provided for optimizing a rotating induction machine system fuzzy logic controller. The fuzzy logic controller has at least one input and at least one output. Each input accepts a machine system operating parameter. Each output produces at least one machine system control parameter. The fuzzy logic controller generates each output based on at least one input and on fuzzy logic decision parameters. Optimization begins by obtaining a set of data relating each control parameter to at least one operating parameter for each machine operating region. A model is constructed for each machine operating region based on the machine operating region data obtained. The fuzzy logic controller is simulated with at least one created model in a feedback loop from a fuzzy logic output to a fuzzy logic input. Fuzzy logic decision parameters are optimized based on the simulation.

In embodiments of the present invention, operating parameters may include a measure of machine system output power and machine flux current.

In another embodiment of the present invention, a plurality of models are created. Simulating the fuzzy logic controller includes switching between models to create a disturbance input to the fuzzy logic controller.

In yet another embodiment of the present invention, fuzzy logic decision parameters include fuzzy membership functions.

In still other embodiments of the present invention, fuzzy logic decision parameters are optimized to achieve a desired dynamic response for the machine system or to optimize machine system power efficiency.

In a further embodiment of the present invention, fuzzy logic decision parameters are optimized using adaptive neuro-fuzzy inference.

In a still further embodiment of the present invention, constructing each model includes building a table for each machine operating region relating at least one machine system operating parameter to at least one machine system control parameter.

A method for optimizing a fuzzy controller for a starter/alternator system is also provided. The fuzzy logic controller has an input for system power and an output for flux current control. The fuzzy logic controller generates current control output based on power input and on fuzzy logic decision parameters. Optimizing the fuzzy logic controller includes obtaining a set of data relating the system power to the current control for at least one machine operating region. A model is constructed for each machine operating region based on the obtained data. The fuzzy logic controller is simulated with at least one created model in a feedback loop from the current control output to the power input. Fuzzy logic decision parameters are optimized based on the simulation.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
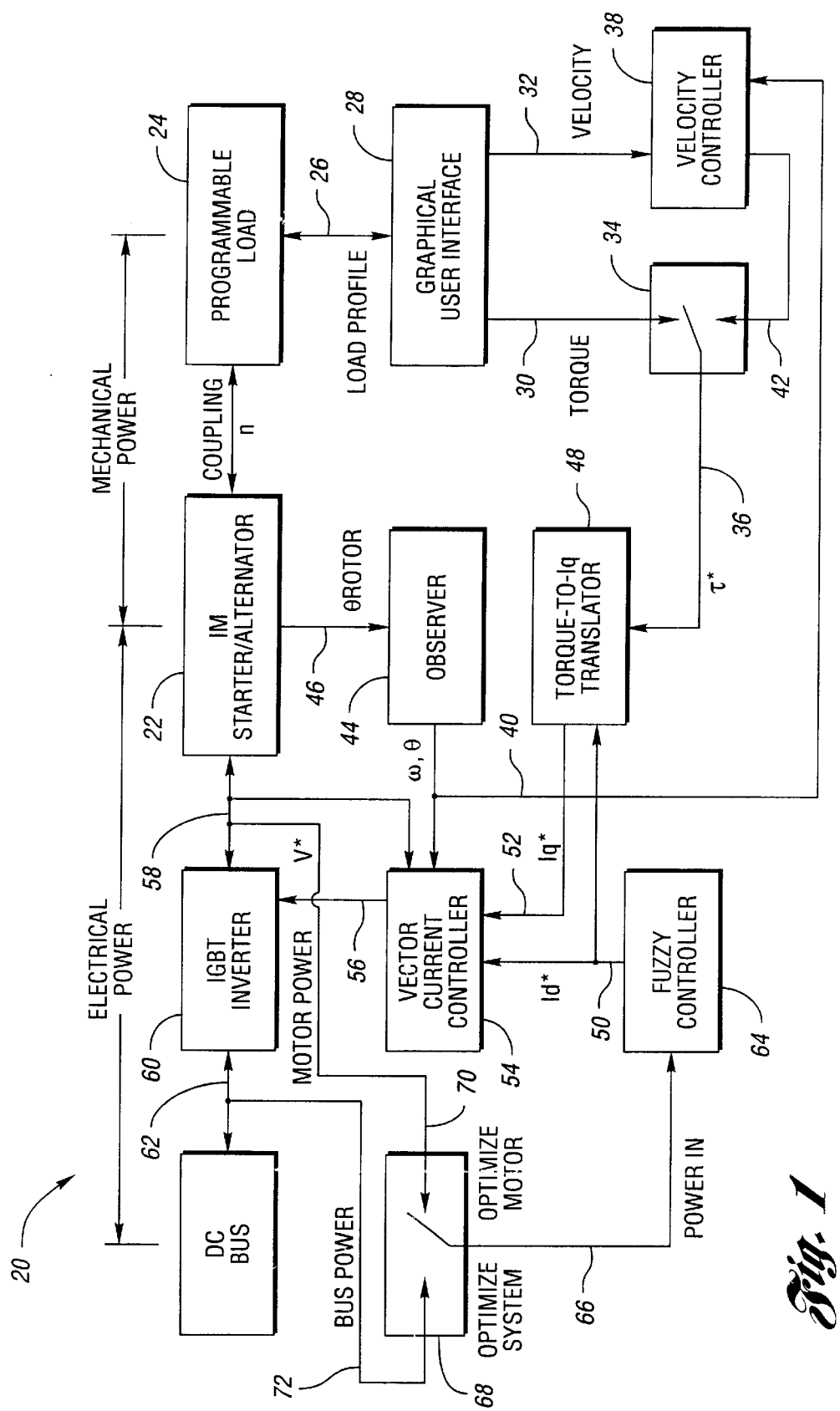
FIG. 1 is a block diagram of a starter/alternator system according to an embodiment of the present invention.

Referring now to FIG. 1, a block diagram of a starter/alternator system is shown. A starter/alternator system, shown generally by 20, includes inductive starter/alternator 22 coupled to programmable load 24. Programmable load 24 may be run in constant speed mode or constant torque mode based on load profile 26 produced by a computer under control of graphical user interface (GUI) 28. GUI 28 calculates load torque 30 and velocity 32, either of which may be used to control starter/alternator 22. If load 24 is speed controlled, starter/alternator 22 is torque controlled. Switch 34 is set to pass load torque 30 as torque command, θ*, 36. If load 24 is torque controlled, starter/alternator 22 is speed controlled. Velocity controller 38 accepts load velocity 32 and rotor velocity, T, 40 and generates torque estimate 42. Rotor velocity 40 is generated by observer 44 based on rotor position, 2rotor, 46. Switch 34 is set to pass torque estimate 44 as torque command 36. Torque-to-Iq translation accepts torque command 36 and flux current, Id*, 50 and generates torque current, Iq*, 52. Vector current controller 54 produces inverter control signal, V*, 56 using torque current 52, flux current 50, and the state of starter/alternator electrical connections 58. IGBT inverter 60 converts bus power 62 to input electrical power on electrical connections 58 when starter/alternator 22 is operating as a motor, and converts output electrical power on electrical connections 58 to bus power 62 when starter/alternator 22 is operating as a generator. This system has four quadrant control, permitting motor or generator operation in either rotational direction. DC bus 62 is the electrical power source when starter/alternator 22 is motoring and is electrical power sink when starter/alternator 22 is generating. The torque command 36 control loop of IGBT inverter 60 is designed to have a relatively fast time constant, permitting a rapid response to small changes in load conditions.

Fuzzy controller 64 generates flux current 50 to optimize the power efficiency of starter/alternator 22 or a subsystem including starter/alternator 22. The control loop containing fuzzy controller 64 is designed to have a relatively long time constant, permitting slow responses to changes in operating conditions such as new load operating regions or temperature. Fuzzy controller 64 generates flux current 50 based on power in signal 66. Switch 68 selects between motor electrical power 70, if the efficiency of starter/alternator 22 is to be optimized, and bus electrical power 72, if the efficiency of starter/alternator 22 and inverter 60 is to be optimized. If starter/alternator 22 is motoring, efficiency is optimized by minimizing power in 66 for a given rated output mechanical power. If starter/alternator 22 is generating, efficiency is optimized by maximizing power in 66 for a given rated input mechanical power.

The goal of fuzzy logic controller 64 is to optimize power efficiency in either or both of generator mode and motor mode. The efficiency of induction machine system 20 is a function of many variables, including machine construction; power components such as converters, inverters, switches, pulse width modulators, and the like; control algorithms; and operating conditions such as load and temperature. A machine system operated at rated flux normally has the best transient response. During periods of light loads, frequently experienced in normal use, excessive core loss results when rated flux current is applied. This greatly reduces the power efficiency of starter/alternator system 20. By properly controlling flux current 50 with fuzzy logic controller 64, optimum efficiency can be achieved even under light load conditions. The dynamic response determining how the optimum efficiency is achieved can be set by tuning fuzzy logic controller 64.

Tuning fuzzy controller 64 begins by obtaining data relating power 66 to flux current 55. This may be accomplished by removing fuzzy controller 64 from starter/alternator system 20. For each desired system operating region, power 66 is measured for each of a set of commanded flux currents 50. The model for each operating region is a table relating flux current 50 to power 66. Interpolation is used to obtain power 66 for values of flux current 50 between table entries. This model has several benefits over traditional mathematical models. First, the model takes into account all components of system 20 between the fuzzy controller output and input. This includes the inverter 60, velocity controller 38, and current controller 54 as well as starter/alternator 22. Second, system complexities such as nonlinearities, higher-order effects, and the like, are automatically included in the model. Third, any change in components or operating conditions may be quickly modeled using the same technique, without having to modify the analytical model or to estimate or experimentally determine new analytical model parameters.

One or more models are then used as hardware-data-in-the-simulation-loop for tuning fuzzy logic decision parameters. A simulation is constructed with fuzzy controller 64 "controlling" the model. The object of the simulation is to observe how fuzzy logic controller 64 achieves optimum power efficiency. In particular, an examination is made to see if the dynamic response of power 66 over time meets design criteria. If not, decision parameters for fuzzy controller 64 are modified until the desired dynamic response is achieved. Decision parameters may be changed manually or automatically.

As an alternative to manually changing fuzzy logic decision parameters and running the simulation again, decision parameters can be automatically tuned using adaptive neuro-fuzzy inference provided by an adaptive neuro-fuzzy inference system (ANFIS). The process takes place in two steps. First, a generic fuzzy system is automatically generated from training data and from user supplied inputs including the number of controller inputs, the number of membership functions, the desired shape of the membership functions, and the like. This may be accomplished, for example, by using the MATLAB® Fuzzy Logic Toolbox genfisl algorithm, which uses a grid partition style. Next, the generic fuzzy system is able to learn or adapt to training data using ANFIS. ANFIS tunes the fuzzy system, altering membership functions for example, using a back propagation algorithm based on the input-output training data. Least square error minimization between actual and desired outputs is accomplished. Following this procedure and incorporating HDSL data allows for automatic tuning that incorporates all system nonlinearities and controller behavior without the need for complex system modeling.

Figure 2:
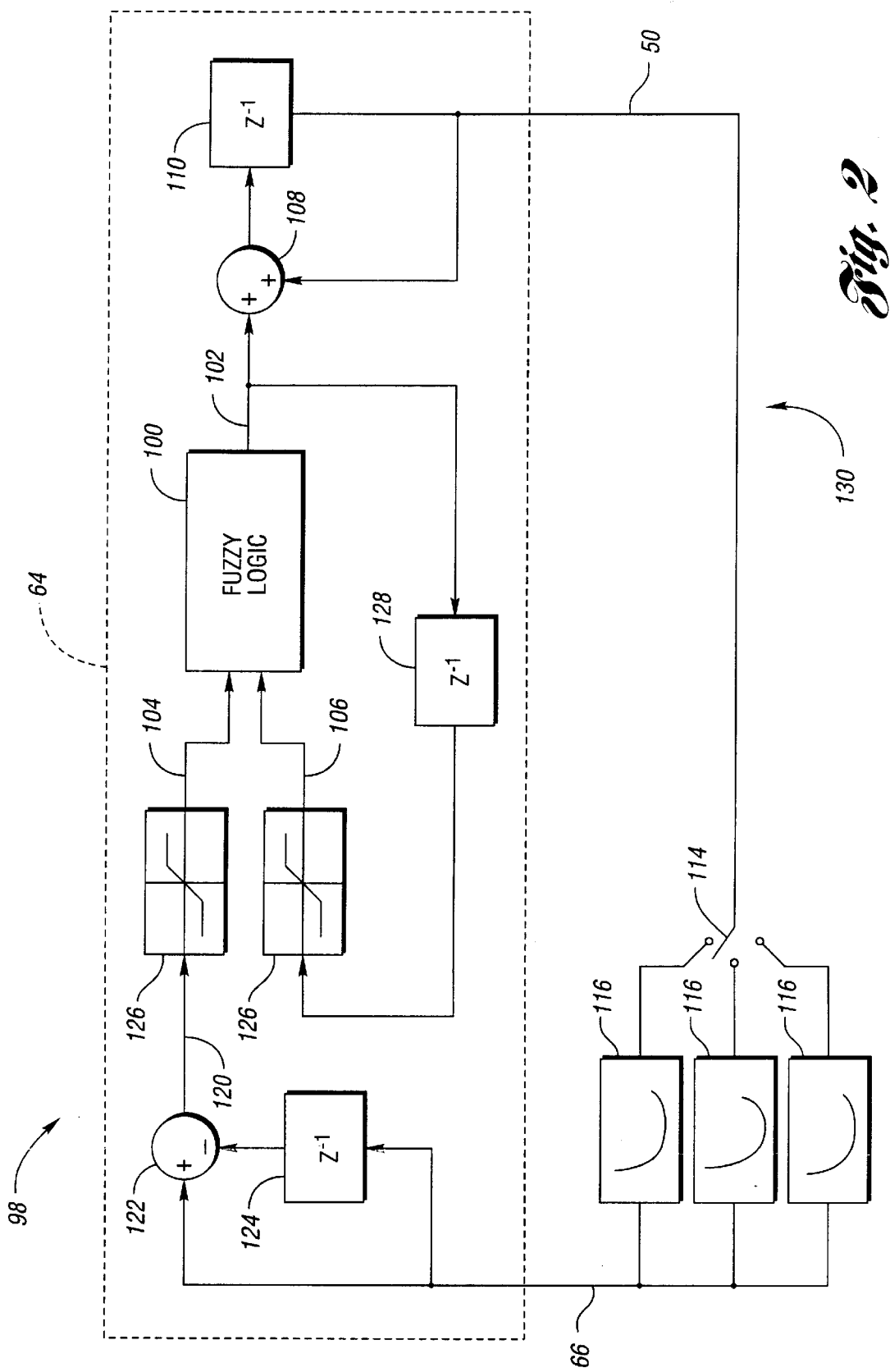
FIG. 2 is a block diagram of a simulation for optimizing fuzzy decision parameters according to an embodiment of the present invention.

Referring to FIG. 2, a block diagram of a simulation for optimizing fuzzy decision parameters is shown. Optimization simulation 98 includes fuzzy controller 64 with fuzzy logic 100 generating the next change in flux current, )Id (next), 102 based on the last change in power, )Pd, 104 and the last change in flux current, )Id(last), 106. Summer 108 and delay 110 convert the next change in flux current 102 into the next flux current 50. Switch 114 selects which model 116 will receive flux current 50. Selected model 116 outputs power 66, which is converted to change in power 120 by differencer 122 and delay 124. Saturation limiter 126 limits the range of change in power 120 to produce change in power 104. Delay element 128 produces last change in flux current 106 from next change in flux current 102. The path from next change in flux current 102 through model 116 to change in power 104 constitutes a feedback path from fuzzy controller output 50 to fuzzy controller input 66, shown generally by 130.

Under normal operating conditions, once steady state optimal efficiency is achieved, only slight corrections from fuzzy controller 64 are required. However, if a change in machine system operating parameters occurs, fuzzy controller 64 will find a new optimal efficiency. A change in operating parameters may occur if a new machine operating region is commanded, such as a change in load, or if a change in operating conditions occur, such as a change in temperature. Such changes may be simulated by connecting a different model 116 to fuzzy controller 64 through switch 114.

Figure 3A:
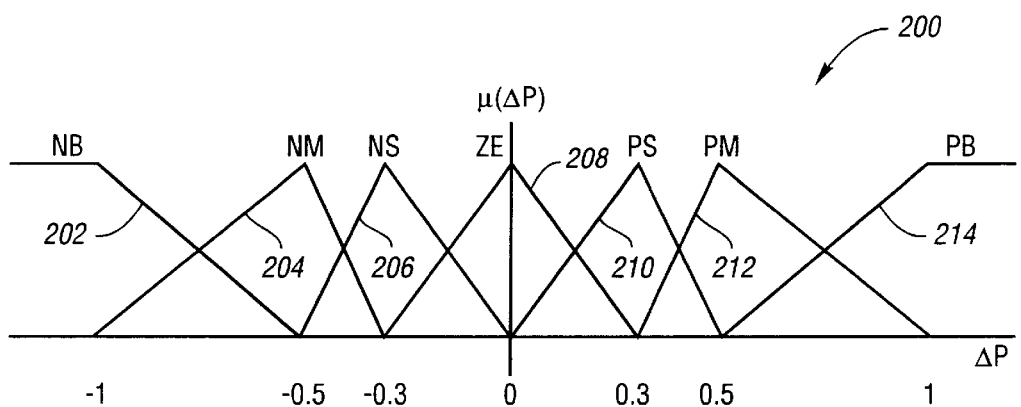
FIGS. 3a–3c are diagrams showing fuzzy decision parameters according to an embodiment of the present invention.
Figure 3B:
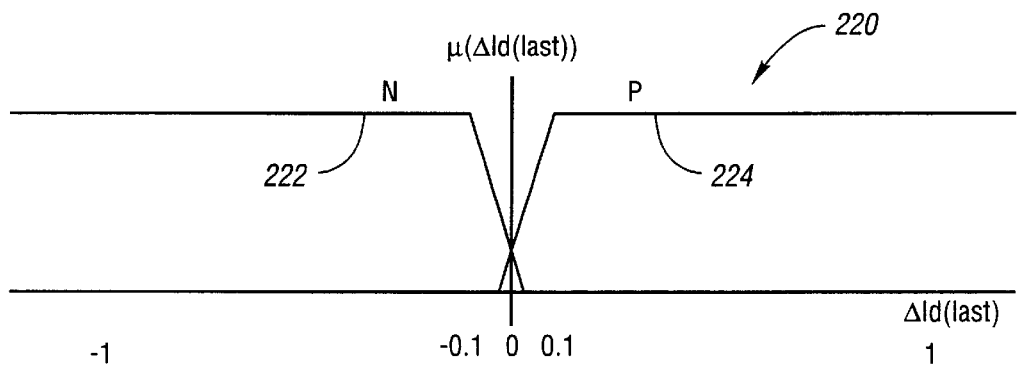
Figure 3C:
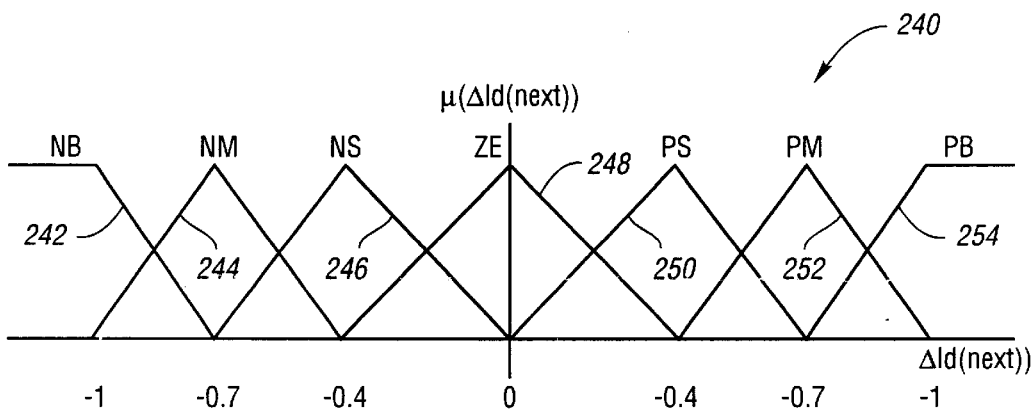

Referring now to FIGS. 3a through 3c, diagrams showing fuzzy decision parameters are shown. FIG. 3a illustrates the membership function for change in power, shown generally by 200. Change in power 104 is divided into seven fuzzy sets, negative big (NB) 202, negative medium (NM) 204, negative small (NS) 206, zero (ZE) 208, positive small (PS) 210, positive medium (PM) 212, and positive big (PB) 214. Change in power membership function 200 breaks change in power 104 into seven ranges based on the size and direction, or sign, of the last change in power 104.

FIG. 3b illustrates the membership function for last change in current, shown generally by 220. Last change in current membership function 220 breaks last change in current 106 into two fuzzy sets, negative (N) 222 and positive (P) 224 Last change in current membership function 220 basically determines the sign of last change in current 106.

FIG. 3c illustrates the membership function for next change in current, shown generally by 240. Next change in current membership function 240 divides next change in current 102 into seven fuzzy sets, negative big (NB) 242, negative medium (NM) 244, negative small (NS) 246, zero (ZE) 248, positive small (PS) 250, positive medium (PM) 252, and positive big (PB) 254. Hence, the output of fuzzy controller 64 can be varied in size and in sign.

In this application, optimizing fuzzy logic decision parameters involves modifying the range and shape of fuzzy sets in membership functions 200, 220, 240. In particular, the starting point, ending point, and peak point for each set 202–214, 222–224, 242–254 may be varied to achieve a desired dynamic response. While triangular sets are shown, it will be recognized by one of ordinary skill in the art that any shaped fuzzy set may be used, including trapezoidal, Gaussian, cosine squared, and the like.

Figure 4:
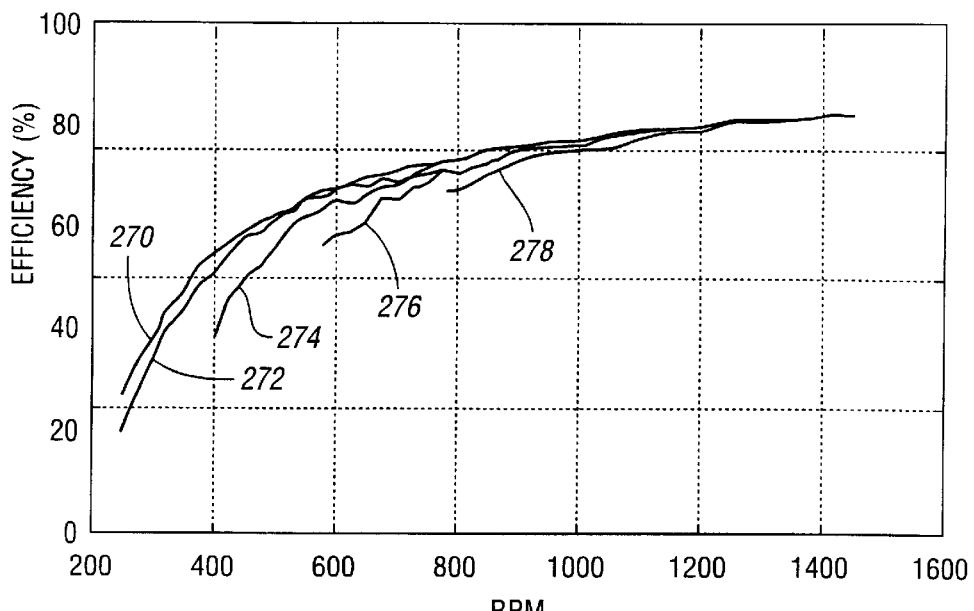
FIG. 4 is a graph illustrating optimum efficiency mapping of four constant power contours for an 8 kW, 12 pole starter/alternator according to an embodiment of the present invention.

Referring now to FIGS. 4–6, experimental results obtained by using a fuzzy logic controller optimized according to an embodiment of the present invention are shown. The fuzzy logic controller controlled an 8 kW, 12 pole machine with windings parallel-connected in an alternator configuration. The starter/alternator is described in a paper by J. M. Miller et al. titled "Starter-Alternator for Hybrid Electric Vehicle: Comparison of Induction and Variable Reluctance Machines and Drives," appearing in IEEE IAS Conference Proceedings, pp. 513–523, 1998. Table 1 below lists the measured equivalent circuit motor parameters.

TABLE 1

Measured Motor Parameters

| Parameter | Units |
|---|---|
| Stator Resistance ($R_S$) | 31 mΣ |
| Stator Inductance ($L_S$) | 0.14 mH |
| Rotor Resistance ($R_R$) | 15 mΣ |
| Rotor Inductance ($L_R$) | 0.09 mH |
| Magnetizing Induct. (@ 46 Arms) | 0.99 mH |

Referring now to FIG. 4, a graph illustrating optimum efficiency mapping of four constant power contours according to an embodiment of the present invention is shown. Optimum efficiency as a function of rotor speed is shown for constant power contours of 1 kW by plot 270, 2 kW by plot 272, 4 kW by plot 274, 6 kW by plot 276, and 8 kW by plot 278. The starter/alternator optimum efficiency is about 85% at 1400 rpm, but drops as low as 35% at speeds below 300 rpm.

Figure 5A:
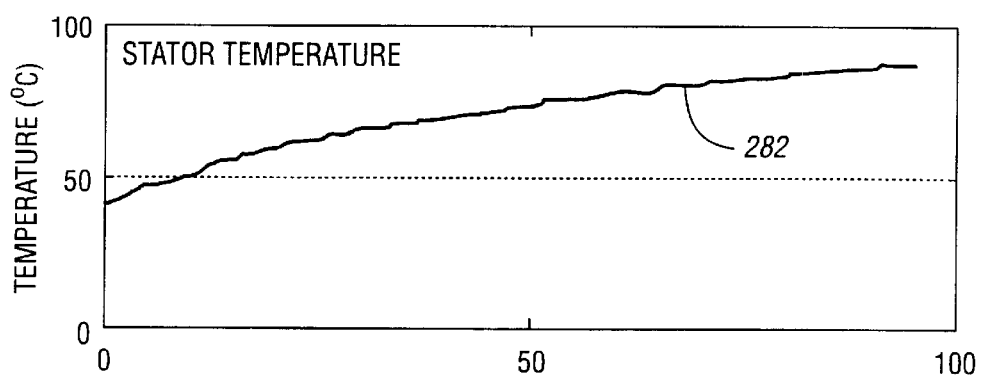
FIGS. 5a and 5b are graphs illustrating fuzzy controller compensation to temperature for an 8 kW, 12 pole starter/alternator according to an embodiment of the present invention.
Figure 5B:
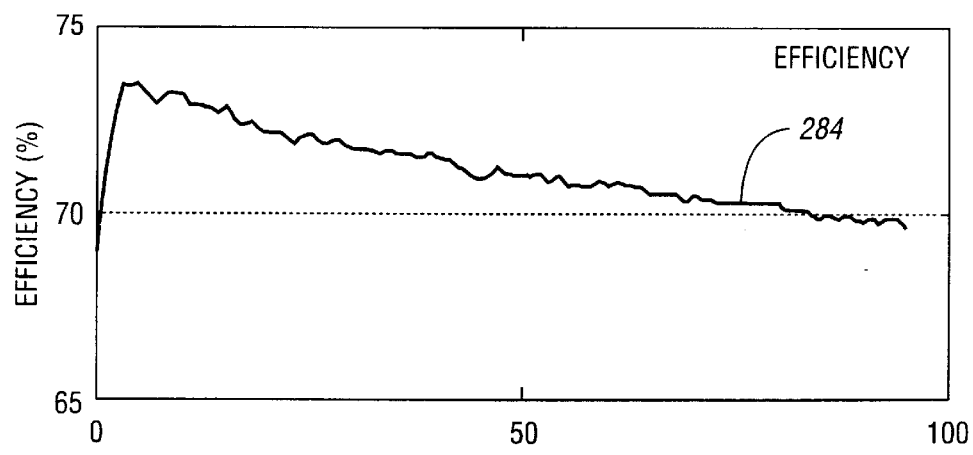

Referring now to FIGS. 5a and 5b, graphs illustrating fuzzy controller compensation to temperature for an embodiment of the present invention are shown. The ability of the fuzzy controller to maintain maximum starter/alternator efficiency during changing conditions is illustrated in FIG. 5. Stator temperature plot 282 is shown rising as a function of time. Time is expressed in terms of the fuzzy controller optimization steps. As illustrated by efficiency plot 284, although the optimum efficiency points at higher temperatures are decreasing, the fuzzy controller continues to track.

Figure 6A:
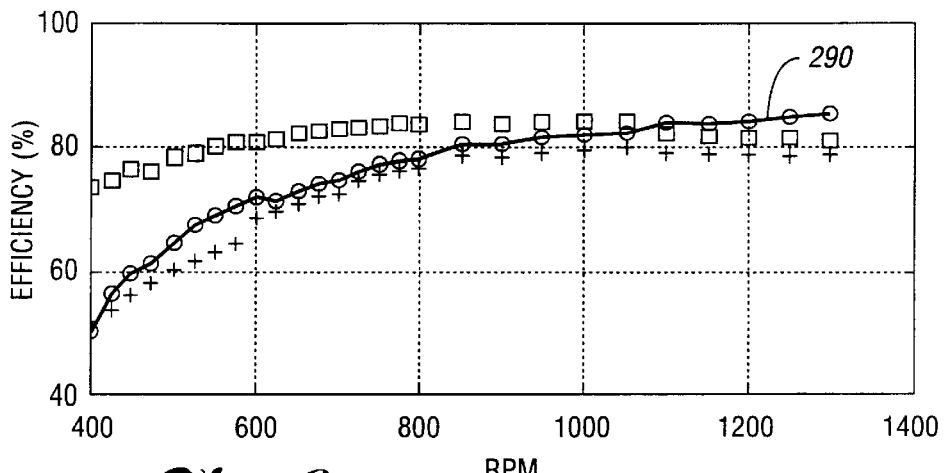
FIGS. 6a–6c are graphs illustrating operating parameters as a function of rotor speed for an 8 kW, 12 pole starter/alternator according to an embodiment of the present invention.
Figure 6B:
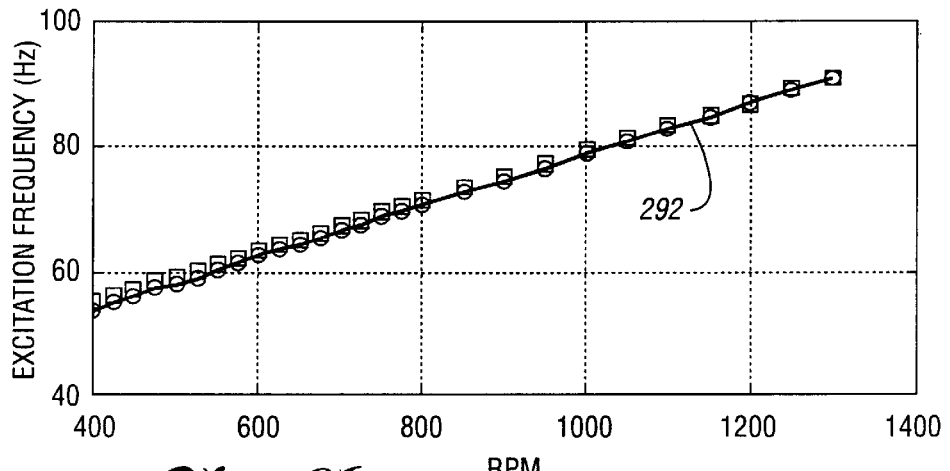
Figure 6C:
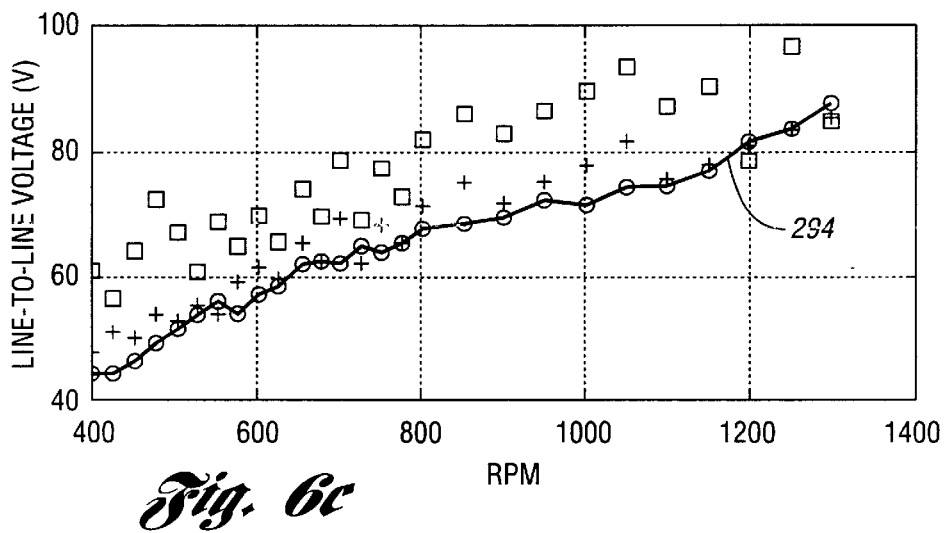

Referring now to FIGS. 6a–6c, graphs illustrating operating parameters as a function of rotor speed for an embodiment of the present invention are shown. Comparisons between predicted and measured efficiency and voltage were obtained for the fuzzy logic controlled induction motor. The results of optimization were obtained on a 4 kW constant power contour.

For a given torque T, speed n, and excitation frequency f, the voltage can be determined as shown in Equation (1):

$$|V| = \sqrt{T\left(\frac{2\pi f}{3p}\right)\left(\frac{1-\frac{np}{60f}}{R_r}\right)\left(\left(R_s + \frac{\Sigma Rr}{1-\frac{np}{60f}}\right)^2 + 4\pi^2 f^2(\Sigma L_r + L_s)^2\right)}$$

where p is the number of poles. It is possible to use these quantities to calculate remaining voltages and currents in the induction motor equivalent circuit.

The expression for induction motor efficiency is shown in Equation (2):

$$\eta = \frac{T\frac{n\pi}{30}}{\frac{2\pi f}{p}T + P_{feo}\left(\frac{Es}{E_o}\right)^2 + P_{fvo}\left(\frac{n}{n_o}\right)^3 + 3I_s^2 R_s}$$

where $P_{feo}$ is the no-load iron core loss, $P_{fvo}$ represents the friction and windage losses, and $E_o$ is the nominal voltage at characterization speed $n_o$ rpm. For a given torque and speed, the efficiency can be maximized with respect to excitation frequency, f.

In FIGS. 6a–6c, measured parameters as a function of rpm are indicated by open circles connected by a line. Estimated parameters without core saturation are indicated by open squares and estimated parameters with core saturation are indicated by crosses. In FIG. 6a, measured efficiency plot 290 is shown to track well with the estimated saturated efficiency. In FIG. 6b, measured excitation frequency plot 292 follows the estimated excitation frequency. In FIG. 6c, measured line-to-line voltage plot 294 closely follows the expected saturated voltage values.

While embodiments of the present invention have been illustrated and described, it is not intended that these embodiments illustrate and describe all possible forms of the invention. Rather, the words used in the specification are words of description rather than limitation and that various changes may be made without departing from the spirit and scope of the invention.

What is claimed is:

1. A method for optimizing a rotating induction machine system fuzzy logic controller, the fuzzy logic controller having at least one input and at least one output, each input accepting a machine system operating parameter, each output producing at least one machine system control parameter, the fuzzy logic controller operative to generate each output based on at least one input and on fuzzy logic decision parameters, the method comprising:

obtaining a set of data relating the at least one control parameter to the at least one operating parameter for at least one machine operating region;

constructing a model for each of the at least one machine operating region based on the obtained data for the machine operating region;

simulating the fuzzy logic controller with at least one created model in a feedback loop from at least one fuzzy logic output to at least one fuzzy logic input; and optimizing fuzzy logic decision parameters based on the simulation.

2. A method for optimizing a rotating induction machine fuzzy logic controller as in claim 1 wherein the at least one operating parameter comprises a measure of machine system output power.

3. A method for optimizing a rotating induction machine fuzzy logic controller as in claim 1 wherein the at least one control parameter comprises flux current.

4. A method for optimizing a rotating induction machine fuzzy logic controller as in claim 1 wherein the at least one model is a plurality of models, simulating the fuzzy logic controller comprising switching between models to create a disturbance input to the fuzzy logic controller.

5. A method for optimizing a rotating induction machine fuzzy logic controller as in claim 1 wherein fuzzy logic decision parameters comprise fuzzy membership functions.

6. A method for optimizing a rotating induction machine fuzzy logic controller as in claim 1 wherein fuzzy logic decision parameters are optimized to achieve a desired dynamic response for the machine system.

7. A method for optimizing a rotating induction machine fuzzy logic controller as in claim 1 wherein fuzzy logic decision parameters are optimized to optimize machine system power efficiency.

8. A method for optimizing a rotating induction machine fuzzy logic controller as in claim 1 wherein fuzzy logic decision parameters are optimized using adaptive neuro-fuzzy inference.

9. A method for optimizing a rotating induction machine fuzzy logic controller as in claim 1 wherein constructing each model comprises building a table for each machine operating region relating at least one machine system operating parameter to at least one machine system control parameter.

10. A method for optimizing a fuzzy logic controller for a starter/alternator system, the fuzzy logic controller comprising an input for system power and an output for flux current control, the fuzzy logic controller operative to generate current control output based on power input and on fuzzy logic decision parameters, the method comprising:

obtaining a set of data relating the system power to the current control for at least one machine operating region;

constructing a model for each machine operating region based on the obtained data;

simulating the fuzzy logic controller with at least one created model in a feedback loop from the current control output to the power input; and optimizing fuzzy logic decision parameters based on the simulation.

11. A method for optimizing a fuzzy logic controller for a starter/alternator system as in claim 10 wherein the at least one model is a plurality of models, simulating the fuzzy logic controller comprising switching between models to create a disturbance input to the fuzzy logic controller.

12. A method for optimizing a fuzzy logic controller for a starter/alternator system as in claim 10 wherein fuzzy logic decision parameters comprise fuzzy membership functions.

13. A method for optimizing a fuzzy logic controller for a starter/alternator system as in claim 10 wherein fuzzy logic decision parameters are optimized to achieve a desired dynamic response for the starter/alternator system.

14. A method for optimizing a fuzzy logic controller for a starter/alternator system as in claim 10 wherein fuzzy logic decision parameters are optimized to optimize starter/alternator system power efficiency.

15. A method for optimizing a fuzzy logic controller for a starter/alternator system as in claim 10 wherein fuzzy logic decision parameters are optimized using adaptive neuro-fuzzy inference.

16. A method for optimizing a fuzzy logic controller for a starter/alternator system as in claim 10 wherein constructing each model comprises building a table for each operating region relating flux current to system power.

\* \* \* \* \*